United States Patent
Hurd

[11] Patent Number: 6,138,940
[45] Date of Patent: *Oct. 31, 2000

[54] REFURBISHABLE SHIPPING SPOOL AND METHOD OF REFURBISHING

[75] Inventor: Curt Hurd, Greensboro, N.C.

[73] Assignee: Re-Source America, I.P., Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/889,464

[22] Filed: Jul. 8, 1997

Related U.S. Application Data

[60] Provisional application No. 60/021,434, Jul. 9, 1996.

[51] Int. Cl.$^7$ .............................. B65H 75/14; B65H 75/18
[52] U.S. Cl. ................. 242/610.6; 242/601; 242/609; 242/118.32; 242/118.7
[58] Field of Search ................... 242/610.6, 610, 242/601, 609, 609.4, 118.2, 118.32, 118.4, 118.7, 920

[56] References Cited

U.S. PATENT DOCUMENTS

| | | | |
|---|---|---|---|
| 2,453,247 | 11/1948 | Moss | 242/118.4 X |
| 3,179,245 | 4/1965 | Bastian, Jr. | |
| 3,396,918 | 8/1968 | Adamson et al. | |
| 3,522,700 | 8/1970 | Fisher, Jr. | |
| 3,620,471 | 11/1971 | Hubbard | 242/118.7 X |
| 4,182,500 | 1/1980 | Schlicker | 242/118.7 |
| 4,696,438 | 9/1987 | Myers | |
| 5,062,580 | 11/1991 | Meagher | 242/125.2 |
| 5,125,590 | 6/1992 | LeCompte | 242/118.7 X |
| 5,205,510 | 4/1993 | Schotter | |
| 5,514,429 | 5/1996 | Kamiharaguchi et al. | |
| 5,605,305 | 2/1997 | Picton | 242/118.7 X |
| 5,660,354 | 8/1997 | Ripplinger | |
| 5,702,066 | 12/1997 | Hurst et al. | 242/601 |
| 5,931,409 | 8/1999 | Nulle et al. | |
| 5,988,556 | 11/1999 | Bednarczyk et al. | |

FOREIGN PATENT DOCUMENTS

| | | |
|---|---|---|
| 0 613 849 A1 | 9/1994 | European Pat. Off. |
| 08337361 | 12/1996 | European Pat. Off. |
| 195 15 833 | 11/1995 | Germany |
| 4260575 | 9/1992 | Japan ...... 242/610.6 |
| 6156878 | 6/1994 | Japan ...... 242/610 |
| WO 90/10244 | 9/1990 | WIPO |
| WO95/09800 | 4/1995 | WIPO |

*Primary Examiner*—Donald P. Walsh
*Assistant Examiner*—William A. Rivera
*Attorney, Agent, or Firm*—Testa Hurwitz & Thibeault, LLP

[57] ABSTRACT

A refurbishable cushioned spool suitable for storing and transporting an extended object. In one embodiment, the spool includes a cushioning material which is removably attached to the cylindrical body portion of the spool. In one embodiment, the cushioning material is held to the spool body by double sided tape. The invention also relates to a method of refurbishing a cushioned spool, including the steps of providing instructions to an end user to return the cushionable spool to a refurbishing center once the extended object has been removed from the spool; inspecting the spool for damage, refurbishing or repairing the cushioned spool; reusing the spool until the end of the useful lifetime of the spool; and thereafter recycling at least a portion of the cushioned spool.

1 Claim, 2 Drawing Sheets

REFURBISHABLE SHIPPING SPOOL AND METHOD OF REFURBISHING

This Appln claims benefit of provisional Appln 60/021,434 Jul. 9, 1996.

FIELD OF THE INVENTION

The invention relates generally to reusable, refurbished packaging and shipping spools which can be used to protect wire, cable, fiber or like materials during storage or transport. In particular, the invention relates to spools which include a cushioning material around the cylindrical portion of the spool about which the wire, cable, fiber or other such material is wound.

BACKGROUND OF THE INVENTION

Many extended objects including, but not limited to, fiber, flexible pipe, wire and optical fiber are stored and/or shipped by winding the extended object about a spool. As shown in FIG. 1, a spool 10 as known to the prior art includes a cylindrical body 12 capped at each end by flanges 14, 14'. The cylindrical body 12 and flanges 14, 14' may be constructed of a polymeric material, a metal, or wood, for example. The extended object 20 to be stored and/or shipped is wound about the cylindrical body 12 and prevented by the flanges 14, 14' from slipping longitudinally off the ends of the spool 10. In this way, the extended object is made compact and easy to store and ship. In addition, the spool and flanges protect the extended object during storage and shipment.

Oftentimes, cushioning material is wrapped around the cylindrical body 12 prior to the winding of the extended object to prevent damage to the extended object. Such damage may be caused, for example, by the diameter of the cylindrical body 12 changing in response to changes in the ambient temperature. Such dimensional changes in the diameter of the spool 10 may in turn cause a change in the tension of the extended object wound about the spool. When a change in the ambient temperature causes the material of the spool 10 to expand to a greater extent than the concomitant change in the extended object wound about the spool 10, the extended object may be damaged by the stresses induced by the expanding spool diameter. For example, fiber optic cable, which consists of a glass fiber core material surrounded by cladding material, does not expand significantly when the ambient temperature is raised. However, such optical fiber is very fragile and may be easily damaged by expansion of cylindrical body 12.

Fragile extended objects wound on spools 10 frequently are protected from dimensional changes in the spool diameter by wrapping and gluing a cushioning material such as a foam, about cylindrical body 12 prior to wrapping the extended object about cylindrical body 12. In this way the extended object is cushioned by the cushioning material. Typically, the cushioning material is bound to the spool with a permanent adhesive, such as epoxy or the like. The cushioning material compresses as the spool body 12 expands, thereby relieving the stress which otherwise would be transmitted to the extended object coiled on the spool 12.

Many spools of this type are discarded after a single use. Those spools 10 which are suitable for multiple reuses may be reused as long as the cushioning material is not damaged. If the foam cushion is damaged, the entire assembly must be discarded. The disposal of such packaging raises environmental concerns, and the nature of their design renders it difficult to effect such disposal in an environmentally sound manner.

Accordingly, it is desired to provide a more environmentally sound cushioned shipping spool that may be refurbished and reused and then easily recycled at the end of its useful life.

SUMMARY OF THE INVENTION

The invention relates to a refurbishable, reusable cushioned spool suitable for storing and transporting an extended object. In one embodiment, the spool includes a removable cushioning material which is removably attached to the cylindrical body portion of the spool. In one embodiment, the cushioning material is adhered to the spool body by an adhesive, such as a pressure sensitive adhesive. The adhesive may be coated onto a double sided tape, which is used to bond the cushioning material to the spool.

The invention also relates to a method of refurbishing a cushioned spool comprising the steps of providing instructions to an end user to return the cushionable spool to a refurbishing center once the extended object has been removed from the spool; inspecting the spool for damage, refurbishing or repairing the cushioned spool; reusing the spool until the end of the useful lifetime of the spool; and thereafter recycling the cushioned spool.

DESCRIPTION OF THE PREFERRED EMBODIMENTS

In one embodiment, the spool 10 includes a cylindrical body 12 capped at each end by flanges 14, 14'. The cylindrical body 12 and flanges 14, 14' may be constructed of a reusable material including but not limited to, a metal such as aluminum, wood or a polymeric material such as polystyrene, polyethylene, acrylonitrile butadiene styrene (ABS), polypropylene or polycarbonate. The cylindrical body 12 is covered by a cushioning material prior to the winding of the elongated object. In a preferred embodiment, the cushioning material is bonded or adhered to cylindrical body 12.

Figure 2:
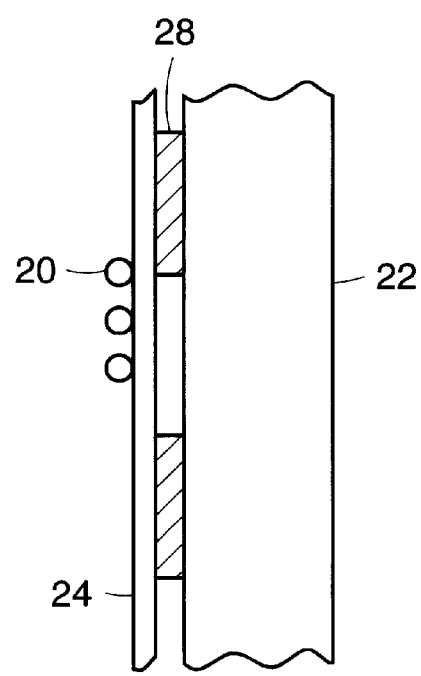
FIG. 2 is cross-section of one wall of the cylindrical body portion of an embodiment of the spool of the invention.

The cushioning material may be formed, for example, from a foamed polymeric material such as polyethylene, polyurethane, polystyrene, or polyvinyl chloride, an elastomeric material such as natural or synthetic rubber, silicone, or plastic sheet material encapsulating air pockets ("bubble wrap"). Referring to FIG. 2, in one embodiment, the cushioning material 24 is affixed to the wall 22 of the cylindrical body 12 of the spool 10 using a removable adhesive. In one embodiment, the adhesive used to join the cushioning material 24 to the spool wall 22 is a pressure sensitive adhesive (PSA). In the embodiment shown, the PSA is in the form of a double sided tape 28, having one side which permanently bonds to the cushioning material 24 but having a second side which can be cleanly removed from the spool wall 22, even after an extended period of time incident to multiple reuses of the spool 10. In another embodiment the PSA is an adhesive layer which sticks strongly to the cushionable material but removably to the spool body 12. In this manner the cushioning material 24 will remain in place against the wall 22 through multiple uses until it is necessary to be replaced. Other bonding or adhesive systems also may be used, for example, an adhesive system comprising two fastener strips which, when placed in face-to-face contact with each other, form an adhesive bond. The adhesive bond preferably is reclosable, that is, the mating surfaces can be separated from each other, and reclosed multiple times. An adhesive system which can be used in the present invention is the SJ-3101/SJ-3102 adhesive system available from 3M (Minnesota Mining and Manufacturing, St. Paul, Minn.).

Figure 1:
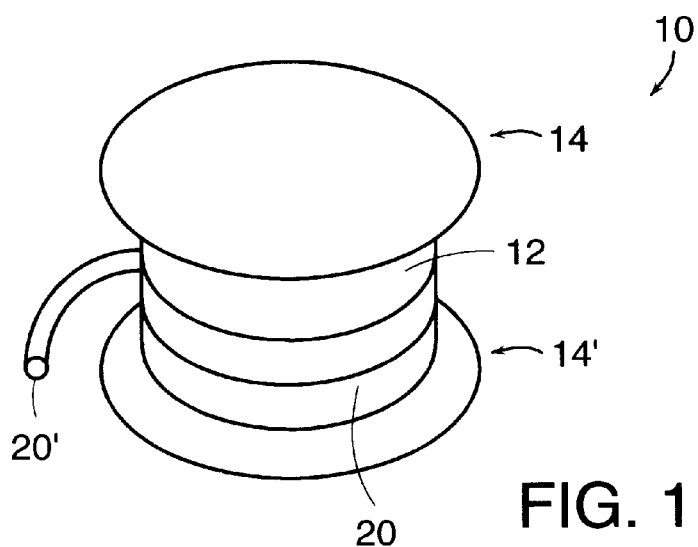
FIG. 1 is an embodiment of a spool known in the prior art.
Figure 3:
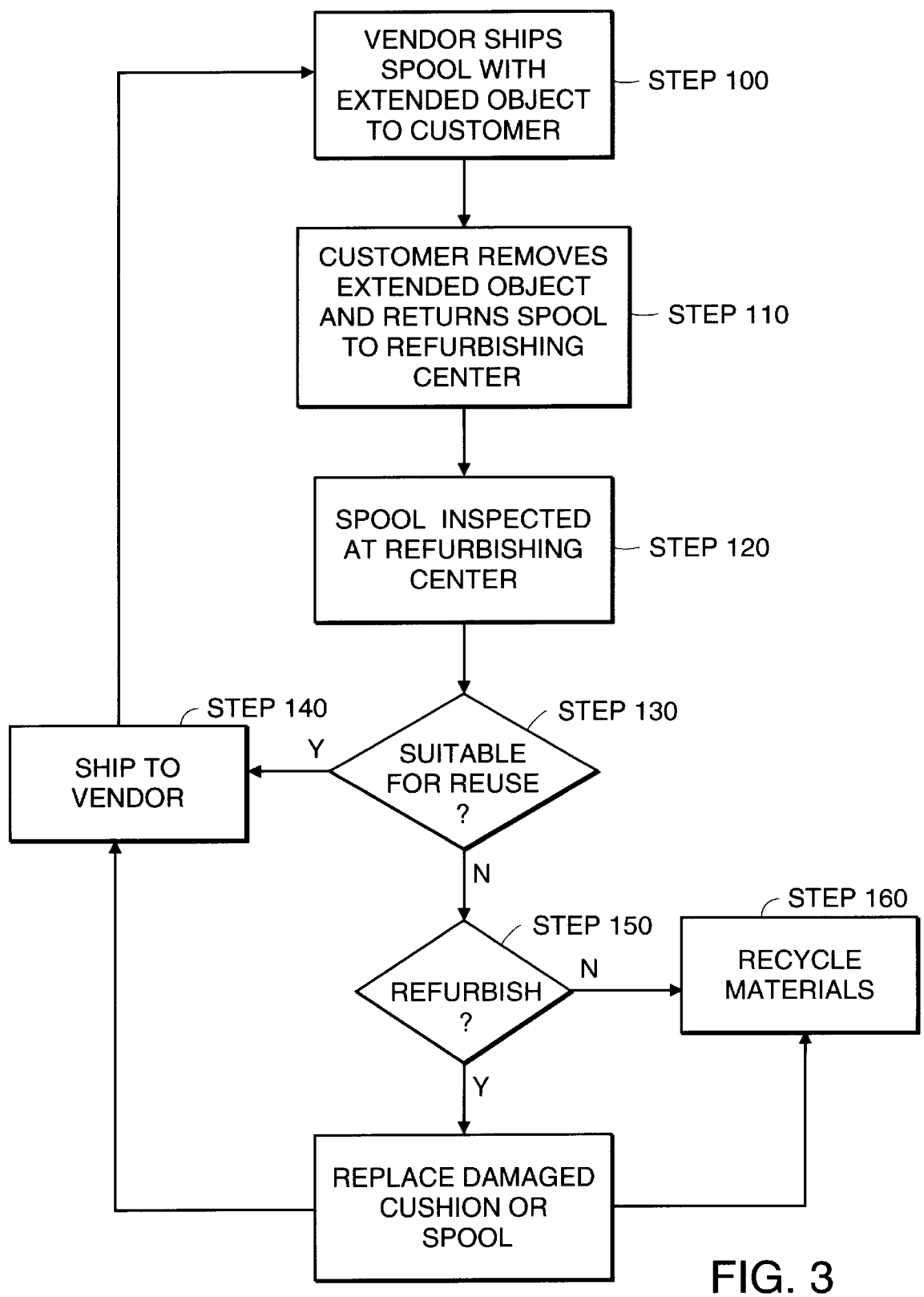
FIG. 3 is a flow chart indicating the steps in using, refurbishing and recycling an embodiment of a spool of the invention.

In use, and referring to FIG. 3, the spool 10 with removable cushioning material 24 is supplied to a vendor of an elongated coilable object, for example, a fiber optic cable. The cable 20 (FIGS. 1 and 2) typically is coiled onto the spool 10 after manufacture. The spool 10 with coiled optical fiber 20 can be stored until it is shipped to a customer (Step 100). The customer receives the spool 10 with coiled optical fiber 20 along with instructions to return the empty spool, once the optical fiber is removed, to a refurbishing center (Step 110). After the empty spool 10 with its cushioning material 24 is received at the refurbishing center, the spool 10 and cushioning material 24 are inspected for damage (Step 120).

If the spool 10 with cushioning material 24 is suitable for reuse (Step 130), the spool 10 with cushioning material 24 is shipped to a vendor for reuse (Step 140). If the spool 10 is too damaged for refurbishing, the components of the spool 10, including the spool material and the cushioning material 24 can be recycled (Step 160).

If the cushioning material 24 is damaged or worn, the spool 10 is refurbished (Step 170) either by repairing the damaged cushioning material 24 or by removing the old cushioning material 24 and replacing it with new cushioning material 24. Similarly if the spool 10 is damaged but the cushioning material 24 is not, the cushioning material 24 may be removed and the damaged spool 10 repaired or replaced, and the cushioning material 24 reattached to the spool 10. The refurbished spool 10 is then returned to a vendor for reuse (Step 140).

Any removed cushioning material 24 may then be recycled (Step 160) in accordance with well known recycling techniques. Similarly, if the spool flanges 14, 14' or cylindrical body 12 are too damaged for reuse, they too may be recycled. Thus, by properly choosing the materials and design employed in the construction of the spool assembly, the spool may withstand multiple uses and may be refurbished.

The return and recycling system which preferably is used to recover, refurbish and/or reuse the spools of the present invention described in co-pending U.S. application Ser. No. 08/630,917, filed Apr. 5, 1996, and in U.S. Pat. Nos. 5,546,061; 5,542,237; 5,469,691; 5,247,747; 5,146,732; and 5,131,212, all of which are hereby incorporated herein by reference.

EQUIVALENTS

Those skilled in the art will recognize many equivalents to the specific embodiments described herein. Such equivalents are intended to be encompassed by the following claims.

What is claimed is:

1. The refurbishable spool comprising:

a reusable body having a first end and a second end;

a reusable first flange located at the first end of said reusable body;

a reusable second flange located at the second end of said reusable body; and a reusable cushionable material removably attached to said reusable body via a two-sided tape having a stronger adhesivie surface for application to said reusable cushionable material and a weaker adhesive surface for application to said reusable body of said spool, wherein said reusable body, said reusable first flange, said reusable second flange and said reusable cushionable material are selected from the group consisting of new, reused and replaced parts.

\* \* \* \* \*